United States Patent
Ohara

(10) Patent No.: US 9,408,376 B2
(45) Date of Patent: Aug. 9, 2016

(54) FISHING REEL

(71) Applicant: Globeride, Inc., Tokyo (JP)

(72) Inventor: Takeshige Ohara, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/522,930

(22) Filed: Oct. 24, 2014

(65) Prior Publication Data

US 2015/0115087 A1   Apr. 30, 2015

(30) Foreign Application Priority Data

Oct. 25, 2013 (JP) .................................. 2013-221861

(51) Int. Cl.

| | |
|---|---|
| *A01K 89/01* | (2006.01) |
| *A01K 89/015* | (2006.01) |
| *F16C 33/76* | (2006.01) |
| *F16C 32/04* | (2006.01) |
| *F16C 33/66* | (2006.01) |

(52) U.S. Cl.
CPC ............... *A01K 89/015* (2013.01); *A01K 89/01* (2013.01); *A01K 89/011223* (2015.05); *F16C 32/0406* (2013.01); *F16C 33/6644* (2013.01); *F16C 33/765* (2013.01)

(58) Field of Classification Search
CPC ........... A01K 89/01; A01K 89/011223; A01K 89/0193; F16C 32/0406; F16C 33/765; F16C 33/7846; F16C 33/7889
See application file for complete search history.

(56) References Cited

U.S. PATENT DOCUMENTS

| 3,734,578 A | * | 5/1973 | Rosensweig | ............. F16J 15/43 310/90.5 |
| 4,692,826 A | | 9/1987 | Raj et al. | |
| 4,797,013 A | * | 1/1989 | Raj | ..................... F16C 33/6644 277/410 |

(Continued)

FOREIGN PATENT DOCUMENTS

| CN | 103842675 | 6/2014 |
| EP | 2 762 739 | 8/2014 |

(Continued)

OTHER PUBLICATIONS

European Search Report dated Mar. 10, 2015 for Appln. No. 14189583.9-1655.

(Continued)

*Primary Examiner* — Emmanuel M Marcelo
(74) *Attorney, Agent, or Firm* — Pillsbury Winthrop Shaw Pittman, LLP

(57) ABSTRACT

An object of the present invention is to provide a fishing reel wherein a bearing rotatably supporting a drive shaft securely shuts out water from its interior so as to maintain stable sealing and thus smooth rotation for a long period wherein such a bearing can be readily built in. In accordance with one aspect, the fishing reel of the present invention includes a drive shaft to be rotationally driven for winding a fishing line around a spool. The drive shaft is rotationally supported by a magnetic fluid sealed bearing having an inner ring magnetic fluid retained between an inner ring and a polar plate retaining a magnet and/or between the inner ring and the magnet, and an outer ring magnetic fluid retained between an outer ring and the polar plate retaining the magnet and/or between the outer ring and the magnet.

7 Claims, 12 Drawing Sheets

(56) References Cited

U.S. PATENT DOCUMENTS

| | | | | |
|---|---|---|---|---|
| 5,152,539 | A | * 10/1992 | Takii | F16C 33/765 277/347 |
| 5,238,254 | A | * 8/1993 | Takii | F16C 33/765 277/347 |
| 6,558,042 | B1 | * 5/2003 | Tompkins | F16C 33/765 277/410 |
| 2011/0248449 | A1 | * 10/2011 | Li | F16J 15/43 277/302 |
| 2012/0048981 | A1 | * 3/2012 | Ohara | A01K 89/0108 242/230 |
| 2015/0063733 | A1 | 3/2015 | Ohara | |
| 2016/0061263 | A1 | 3/2016 | Ohara | |

FOREIGN PATENT DOCUMENTS

| | | |
|---|---|---|
| JP | 62297539 A | * 12/1987 |
| JP | 02-102920 | 4/1990 |
| JP | 05-065922 | 3/1993 |
| JP | 11-276042 | 10/1999 |
| JP | 2013-000110 | 1/2013 |

OTHER PUBLICATIONS

Chinese Office Action dated Jun. 14, 2016 for Appln. No. 201410575599.1.

* cited by examiner

FISHING REEL

CROSS-REFERENCE TO RELATED APPLICATIONS

This application is based on and claims the benefit of priority from Japanese Patent Application Serial No. 2013-221861 (filed on Oct. 25, 2013), the contents of which are hereby incorporated by reference in their entirety.

TECHNICAL FIELD

The present invention relates to a fishing reel to be used in a harsh environment, and in particular to a fishing reel wherein bearings magnetically sealed with a magnetic fluid rotatably support various drive shafts so as to maintain rotational performance of the various drive shaft.

BACKGROUND

Conventionally, various sealing structures are applied to fishing reels such as spinning reels, double bearing reels, and electric reels so as to shut out foreign substances such as moisture and dust. Foreign substances tend to penetrate into fishing reels through the parts rotationally driven by handle operation or drive motors (drive shafts), and in particular through the bearings rotationally supporting the drive shafts. Penetration of foreign substances through such parts is unfavorable for maintaining smoothness of rotational operation of the handle. To overcome this problem, Japanese Patent Application Publication No. 2013-110 (the "'110 Publication") discloses a fishing reel having a built-in bearing with a magnetic sealing mechanism wherein the bearing supporting a drive shaft rotationally driven by handle operation is sealed with a magnetic fluid. The bearing of the fishing reel disclosed in the '110 Publication has one-side magnetic sealing structure wherein a magnetic fluid is retained between an inner ring or an outer ring of the bearing and a retaining plate retaining a magnet.

When used in a harsh environment where seawater or dust tends to adhere or penetrate, even a fishing reel having a bearing disclosed in the '110 Publication cannot completely shut out seawater from the interior of the bearing. The seawater in the bearing may degrade smoothness of the bearing, making it impossible to maintain the smooth rotation for a long period. The '110 Publication discloses an embodiment wherein an O-ring is held on an opposite side to the retained magnetic fluid for sealing. However, the O-ring made of rubber is susceptible of degradation and damage. The fishing reel of this embodiment cannot maintain the stable sealing for a long period, and the increased number of parts complicates the build-in work.

Further, bearings, which are conventionally made of carbon steel or martensite-based stainless steel, may rust when used in a harsh environment where seawater tends to adhere or penetrate. Therefore, even if waterproofness for the interior of the bearing is simply increased, rusting from the inner ring, the outer ring, and the polar plate may cause sticking between these portions and the drive shaft or the housing (reel body) or cause improper operation of other drive components. Also, such a bearing is less corrosion resistive.

SUMMARY

The present invention is intended to address the above problem. An object of the present invention is to provide a fishing reel wherein a bearing rotatably supporting a drive shaft securely shuts out water from its interior so as to maintain stable sealing and thus smooth rotation for a long period and wherein such a bearing can be readily built in.

To the above end, the fishing reel of the present invention includes a drive shaft rotationally driven for winding a fishing line around a spool wherein the drive shaft is rotationally supported by a magnetic fluid sealed bearing having an inner ring magnetic fluid retained between an inner ring and a polar plate retaining a magnet and/or between the inner ring and the magnet, and an outer ring magnetic fluid retained between an outer ring and the polar plate retaining the magnet and/or between the outer ring and the magnet.

In this fishing reel, the drive shaft rotationally driven for winding a fishing line around the spool is rotatably supported by the reel body via the bearing. Additionally, since the bearing is provided with a magnetic fluid seal (hereinafter also referred to as "a magnetic sealing mechanism") having the inner ring magnetic fluid and the outer ring magnetic fluid, foreign substances such as seawater and dust that tend to move on an inner surface of the inner ring and an inner surface of the outer ring can be securely shut out from the interior, so as to maintain the rotational performance of the bearing and smooth rotation of the drive shaft for a long period. Further, since the bearing is previously provided with the inner ring magnetic fluid and the outer ring magnetic fluid, the bearing can be readily built into the reel body.

In the above arrangement, the drive shaft is rotationally driven during rotational operation of the handle for winding a fishing line or during driving of a drive motor as in an electric reel. The present invention can be applied to various fishing reels including such a drive shaft (e.g., spinning reels, double bearing reels, and electric reels). When the reel body includes a plurality of drive shafts, at least one of the drive shafts should be supported by a bearing having the above magnetic sealing mechanism, and the magnetic sealing mechanism should preferably be provided on both axial end surfaces of the bearing. Further, the magnetic fluid, retained between the polar plate and the inner ring (outer ring), may alternatively be retained between the magnet retained by the polar plate and the inner ring (outer ring).

The present invention provides a fishing reel wherein, even in a harsh environment where seawater tends to adhere or penetrate, a bearing rotatably supporting a drive shaft securely shuts out water from its interior so as to maintain stable sealing and thus smooth rotation for a long period and wherein such a bearing can be readily built in.

DESCRIPTION OF EXAMPLE EMBODIMENTS

Embodiments of a fishing reel according to the invention will be hereinafter described with reference to the drawings.

Figure 1:
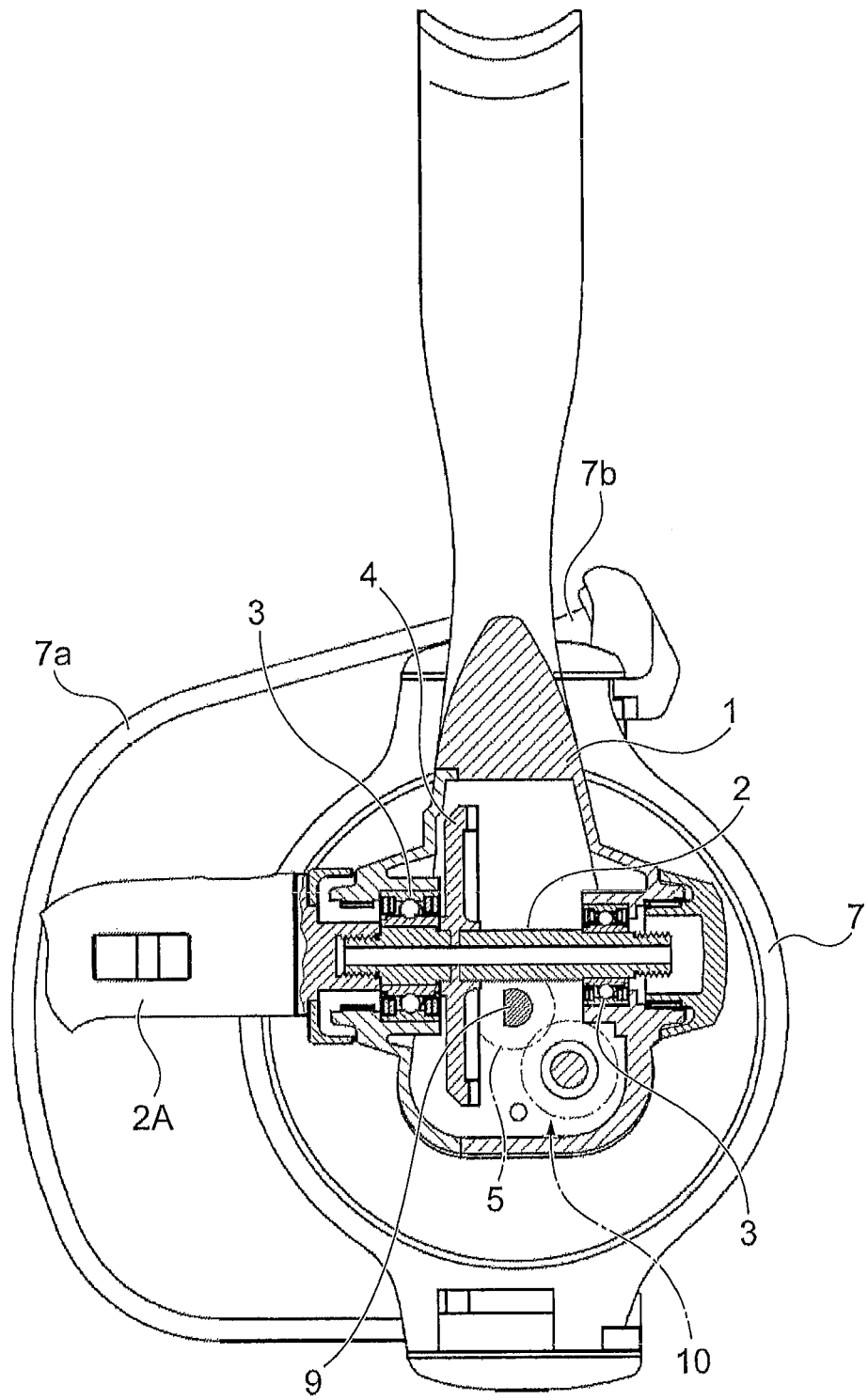
FIG. 1 is a rear view of a first embodiment of the fishing reel (spinning reel) according to the present invention, showing the internal structure thereof.
Figure 2:
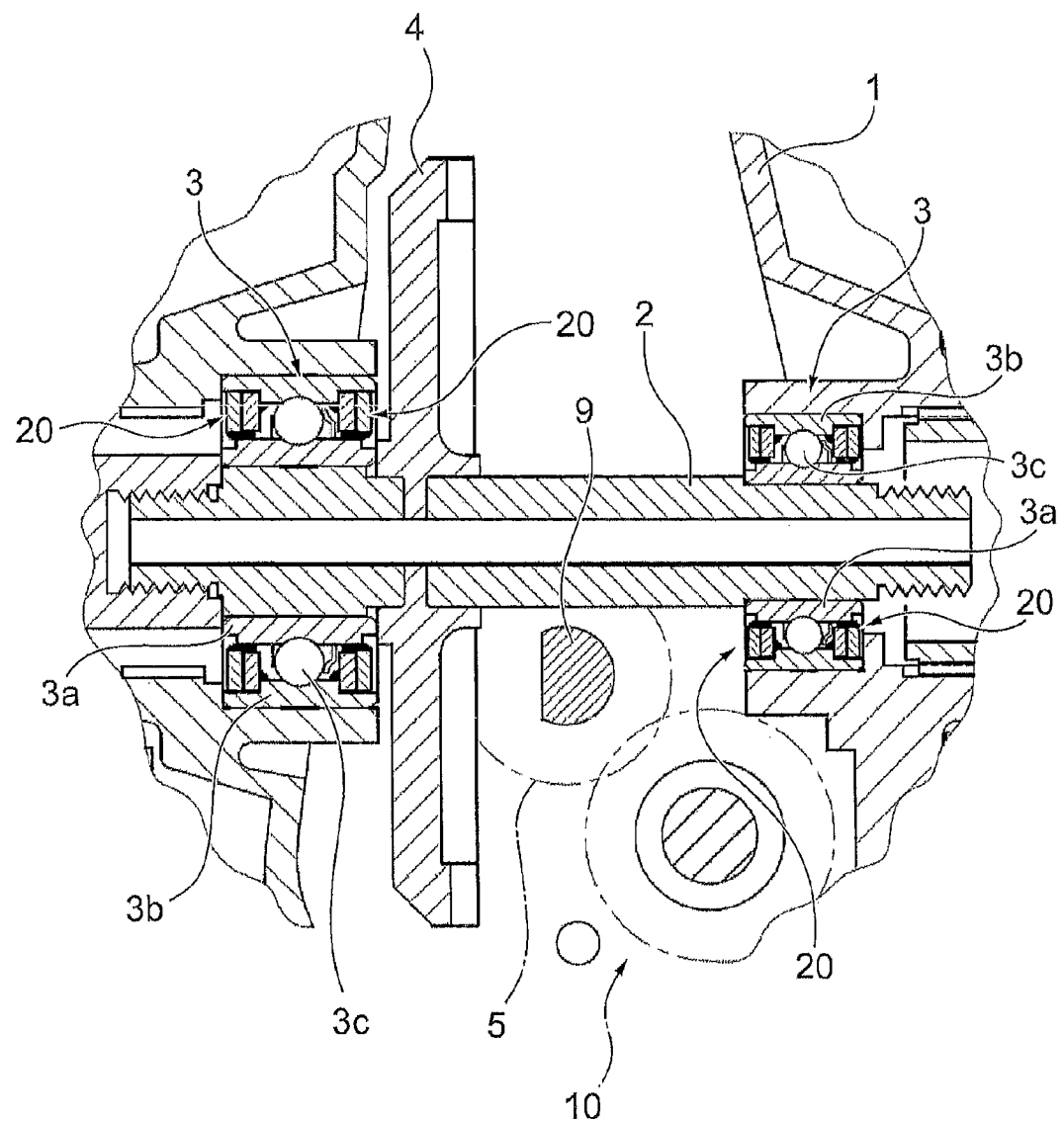
FIG. 2 is an enlarged view of a main part of the fishing reel shown in FIG. 1.
Figure 3:
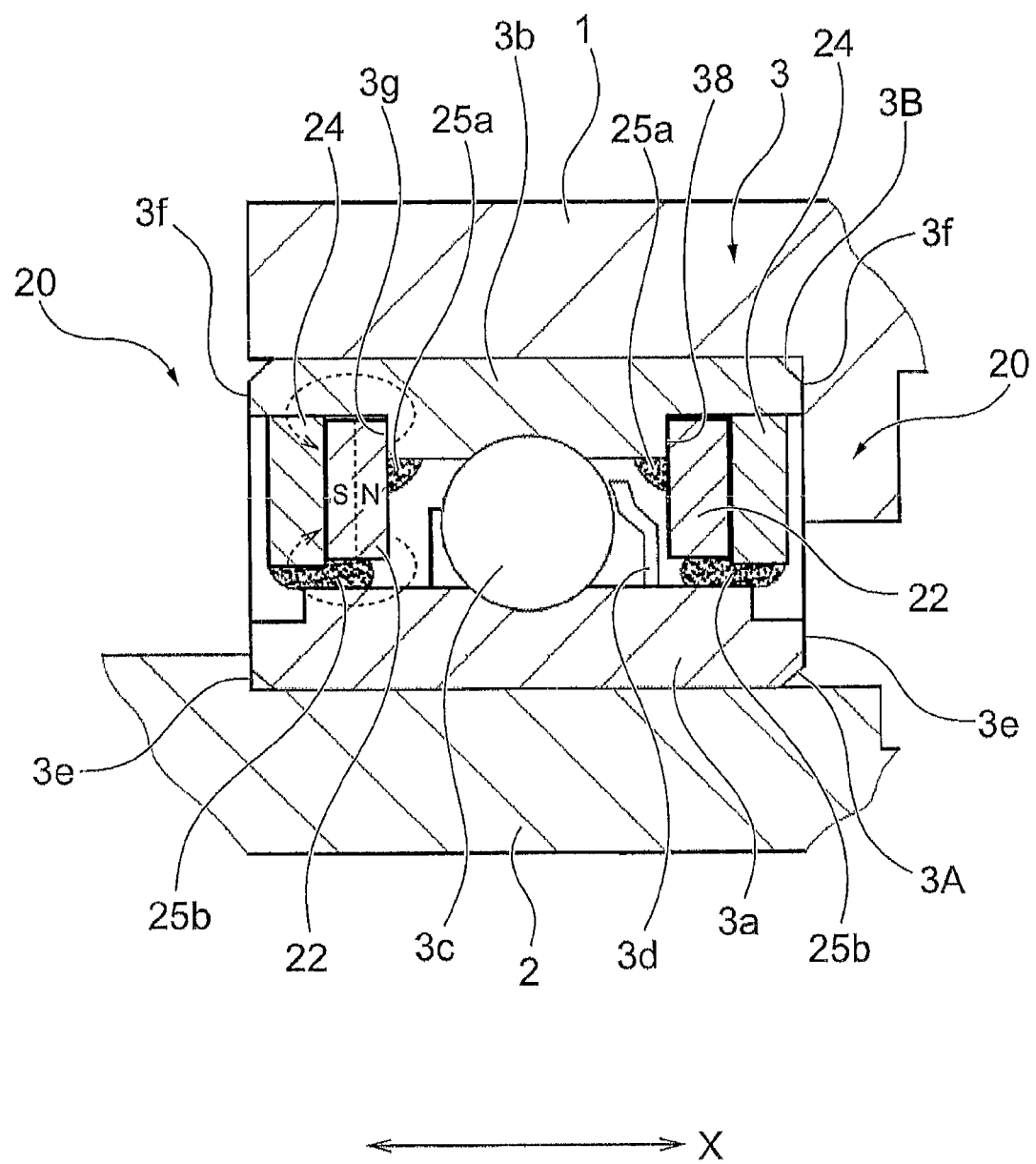
FIG. 3 is an enlarged view of the bearing shown in FIG. 2.
Figure 4:
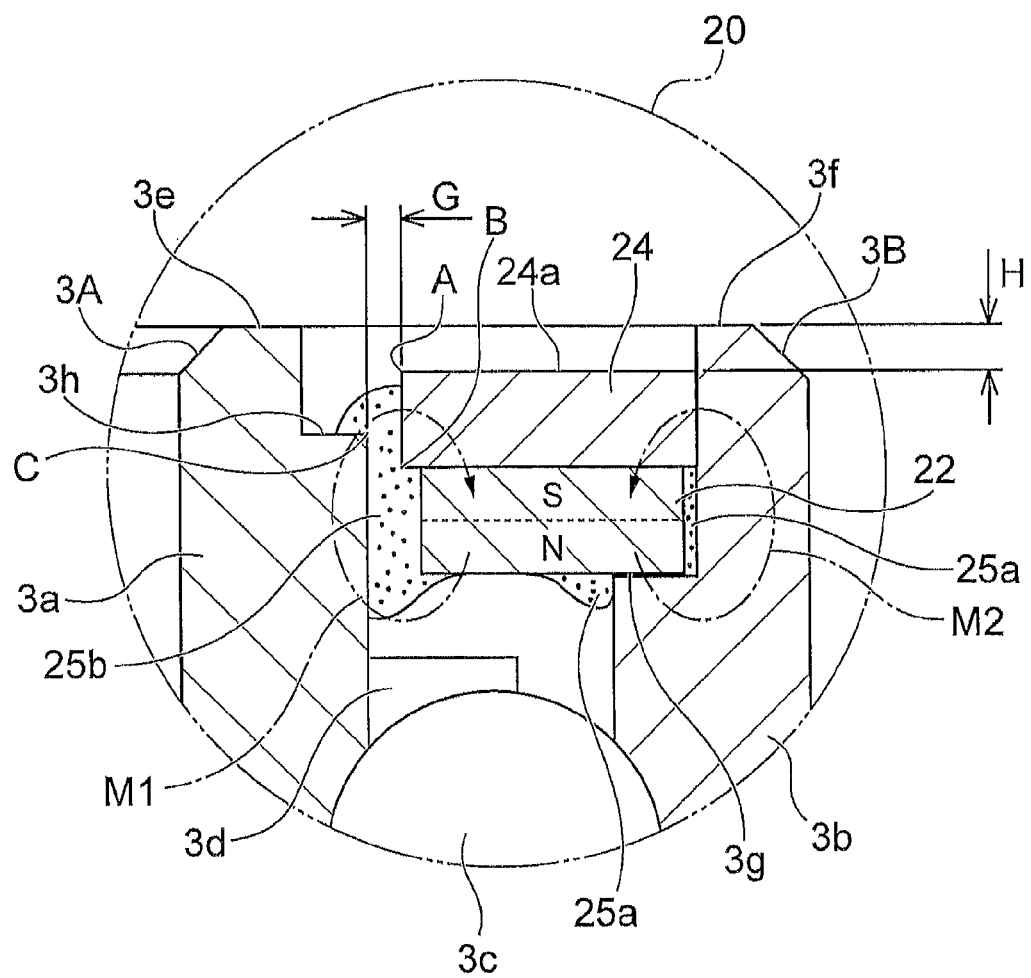
FIG. 4 is an enlarged view of a magnetic sealing mechanism of the bearing shown in FIG. 3.

FIGS. 1 to 4 show the first embodiment of the fishing reel (spinning reel) according to the present invention, wherein FIG. 1 shows the internal structure, FIG. 2 is an enlarged view of a main part of the fishing reel shown in FIG. 1, FIG. 3 is an enlarged view of the bearing shown in FIG. 2, and FIG. 4 is an enlarged view of a magnetic sealing mechanism of the bearing shown in FIG. 3.

In the reel body 1 of the spinning reel, a handle shaft (drive shaft) 2 to be rotationally driven by a handle 2A may be rotatably supported via a pair of bearings 3, 3. On the handle shaft 2 may be fixed a drive gear 4 so as to be rotatable integrally with the handle shaft 2, and the drive gear 4 may mesh with a tooth portion of a pinion gear 5 extending orthogonally to the handle shaft 2 and rotatably supported via a bearing. On the distal end of the pinion gear 5 may be mounted a rotor 7 having a bail 7a and a line roller 7b with a rotor nut screwed in such that the rotor 7 may be rotatable integrally with the pinion gear 5.

The pinion gear 5 may have a through hole extending axially and through which a spool shaft 9 may be inserted. The spool shaft may retain on its distal end a spool (not shown) around which a fishing line is to be wound. On the proximal end of the spool shaft 9 may be connected a publicly known oscillating mechanism 10. When the handle shaft 2 is rotated by rotational operation of the handle 2A, the spool shaft 9 may be reciprocated along the axial direction.

In the above fishing spinning reel, when the handle 2A is rotated, the pinion gear 5 may be rotationally driven due to the meshing between the drive gear 4 and the pinion gear 5, and the rotor 7 may be rotationally driven. Also, the spool shaft 9 may be reciprocated in a front-rear direction via the oscillating mechanism 10. During the winding operation of the handle 2A, the spool may be reciprocated in the front-rear direction along with the spool shaft 9 in synchronization with rotation of the rotor 7; and the fishing line may be evenly wound around the spool reciprocating in the front-rear direction via the line roller 7b of the rotor 7 rotating.

As stated above, the reel body 1 may contain drive shafts (the handle shaft, the pinion gear, etc.) that are rotationally driven during rotational operation of the handle 2A. Among the bearings supporting the drive shafts, a pair of bearings 3, 3 rotatably supporting the handle shaft 2 may be prone to catch foreign substances coming from outside. In the embodiment, a magnetic sealing mechanism (magnetic fluid seal) 20 may be disposed on the bearings 3, 3.

The magnetic sealing mechanism 20 of the embodiment will be hereinafter described in detail. The bearings 3, 3 disposed on both sides of the spool shaft 9 may have the same configuration. Therefore, these bearings, which are the same elements, are denoted by the same reference numeral.

Each of the bearings 3, 3 may include an inner ring 3a which is rotatably fitted on the handle shaft side, an outer ring 3b which is rotatably fitted on the reel body side, and multiple rolling members (rolling elements) 3c disposed between the inner and outer rings. The rolling members 3c may be retained by a retainer 3d, and allow the inner ring 3a and the outer ring 3b to rotate relative to each other.

The inner ring 3a, the outer ring 3b, and the rolling members 3c may be formed of a magnetic material such as chrome-based stainless steel (SUS440C); and the retainer 3d may be formed of a highly corrosion-resistant and heat-resistant material such as a stainless steel material (SUS304). The rolling members 3c may not necessarily be magnetic bodies, but may be formed of, e.g., a ceramic-based material that is free from the magnetic field effect. In the embodiment, an exposed end surface 3e of the inner ring 3a and an exposed end surface 3f of the outer ring 3b may be coplanar (or substantially coplanar); alternatively, the outer ring 3b may be longer in the axial direction than the inner ring 3a (the outer ring 3b may include an extended cylindrical portion axially projecting relative to the inner ring 3a), or the inner ring 3a may be longer in the axial direction than the outer ring 3b.

In the opening between the inner ring 3a and the outer ring 3b may be provided a magnetic sealing mechanism 20. As in the embodiment, the magnetic sealing mechanism 20 should preferably be provided in both openings between the inner ring 3a and the outer ring 3b to enhance the sealing in the bearing; alternatively, the magnetic sealing mechanism 20 may be provided only in the opening facing the outer side plate of the reel body 1 (which is prone to be subjected to seawater, etc.).

The magnetic sealing mechanism 20 may include a ring-shaped magnet (hereinafter referred to as "the magnet") 22, a ring-shaped polar plate (hereinafter referred to as "the polar plate") 24 disposed on the axially outer side surface of the magnet 22 and fixed on any one of the inner ring 3a and the outer ring 3b, and magnetic fluids (an outer ring magnet fluid 25a and an inner ring magnetic fluid 25b) retained in magnetic circuits formed by the magnet 22. These members may constitute a function of sealing for shutting out dust, moisture, etc. from the rolling members 3c.

The magnet 22 may be a permanent magnet having a high flux density and a high magnetism, such as a neodymium magnet prepared by sintering. As shown in FIG. 4, the magnet 22 may be previously magnetized such that the magnetic poles (the S-pole, the N-pole) point to the axial directions (the directions X of the axial core of the bearing). On the axially outer side surface of the magnet 22 may be disposed the polar plate 24. The polar plate 24 may have substantially the same shape as the magnet 22 and may be formed of a magnetic material such as chrome-based stainless steel (SUS440C).

In the embodiment, the magnet 22 and the polar plate 24 may be either previously bonded to or simply contacting with each other such that the magnet 22 is positioned closer to the rolling members. When these two elements are previously bonded to each other, the magnet 22 can be readily positioned or centered, and the magnet 22 and the polar plate 24 are integrated into a unit that can be readily built in.

The outer ring magnetic fluid 25a and the inner ring magnetic fluid 25b may be prepared by dispersing magnetic fine particles such as $Fe_3O_4$ into a base oil (using a surfactant) so as to have viscosity and react with a magnet brought close. Thus, the magnetic fluids 25a, 25b may be stably retained in position by the magnet 22 and the magnetic circuits M1, M2 formed between the inner ring 3a, the outer ring 3b, and the polar plate 24 made of a magnetic material.

In the embodiment, a step 3g may be projected from the inner surface of the outer ring 3b toward the rolling members.

Due to the presence of the step 3g, the outer ring 3b may be thinner near the both openings and thicker near the rolling members. Thus, the distance between the inner ring and the outer ring is larger in the axially outer regions than in the axially inner region. The step 3g may create a small clearance (step clearance) with the surface of the magnet 22 in which the magnetic fluid is to be retained. The step 3g in the embodiment may be formed to have a vertical surface with respect to the axial direction; therefore, the magnet 22 retained by the polar plate 24 can be inserted through the opening until it contacts (or is adsorbed by) the step (the vertical surface) 3g. Thus, the magnet can be readily positioned and fixed.

As in the embodiment, the step 3g may include a staircase or may be sloped instead of having a vertical surface with respect to the axial direction X, as long as the magnetic fluid can be stably retained between the step 3g and the magnet 22. Alternatively, the step for positioning and fixing the magnet may be formed on the inner ring 3a.

The polar plate 24 may have an outer diameter slightly larger than the inner diameter of the outer ring 3b (at the thinner portion) and may be configured to be press-fitted into the opening of the outer ring 3b along with the magnet 22 bonded thereto (the polar plate may be fixed on the outer ring). The polar plate 24 may be formed to have a size so as to create a clearance G with the outer circumferential surface of the inner ring 3a when press-fitted into the outer ring 3b along with the magnet 22 bonded to the polar plate 24. When the polar plate 24 retaining the magnet 22 is press-fitted through the opening until the magnet 22 contacts the step 3g, a small clearance (step clearance) for receiving the magnetic fluid may be created between the step 3g (the outer ring 3b) and the magnet 22 which are not tightly contacted with each other. Such a clearance may be created subject to the dimensional accuracy and the manufacturing errors of the magnet 22. Even if there is a small clearance between the magnet 22 and the step 3g or the outer ring 3b or if there is a small clearance between the polar plate 24 and the outer ring 3b, such a clearance may receive the magnetic fluid 25a to form a secure seal even on the side where the polar plate is fixed. The polar plate 24 retaining the magnet 22 may be built in the bearing by loose fit or magnetic fixing, in addition to press-fit.

In the embodiment, the polar plate 24 retaining the magnet 22 may be recessed from the end surface 3f of the outer ring 3b and the end surface 3e of the inner ring 3a. More specifically, the polar plate 24 may be positioned such that the end surface 24a thereof facing the opening may be recessed from the end surface 3f of the outer ring and the end surface 3e of the inner ring by an amount H, as shown in FIG. 4.

The recess amount H should be such that, when the outer ring or the inner ring is pinched by fingers in a maintenance work, the magnetic fluids 25a, 25b retained in the sealing portions are prevented from adhering to the fingers. The recess amount H should range from 0.01 to 1.0 mm, or more preferably from 0.05 to 0.5 mm. That is, if the recess amount H is smaller than 0.01 mm, the magnetic fluids may tend to contact foreign objects or adhere to fingers when the rings are pinched by the fingers; and if the recess amount H is larger than 1.0 mm, the axial length is unwantedly long, which may adversely affect the built-in work. The end surfaces of the inner ring and the outer ring may include tapered portions 3A, 3B, respectively, which extend in the circumferential direction. Such tapered portions may facilitate the built-in work of the bearings.

As stated above, when the polar plate 24 retaining the magnet 22 magnetized such that the magnetic poles point to the axial directions is press-fitted into the outer ring 3b, magnetic flux (magnetic circuits M1, M2) may be formed at the inner ring 3a and the outer ring 3b so as to be symmetric with respect to the axial direction, as shown in FIG. 4. Thus, the clearance G between the polar plate 24 and the inner ring 3a and the clearance between the magnet 22 and the outer ring 3b may retain the inner ring magnetic fluid 25b and the outer ring magnetic fluid 25a, respectively. More specifically, when the clearance G is filled with the magnetic fluid by using an injection apparatus such as a dropper, the magnetic circuit M1 may produce a seal in the clearance G (between the inner ring 3a and the polar plate 24 and/or between the inner ring 3a and the magnet 22) with the inner ring magnetic fluid 25b. The magnetic fluid injected may move to the outer ring along the surface of the magnet 22, and the magnetic circuit M2 formed at the outer ring may cause the magnetic fluid to be retained in a small clearance between the outer ring 3b and the magnet 22 and/or between the outer ring 3b and the polar plate 24 to produce a seal with the outer ring magnetic fluid 25a on the fixed side of the polar plate 24.

In the embodiment, the inner ring 3a of the bearing may be provided with a step 3h for retaining the magnetic fluid. Such a step 3h formed in the clearance between the polar plate and the inner ring may allow the magnetic fluid 25b to be retained in the recessed position without projecting from the exposed end surface 24a of the polar plate 24. If an edge C of the step 3h is below an edge B of the polar plate 24, the magnetic fluid may not be sufficiently retained between the polar plate 24 and the inner ring; in contrast, if the edge C of the step 3h is above the edge A of the polar plate 24, the magnetic fluid may project and tend to adhere to foreign objects. Therefore, the step 3h should preferably be formed such that the edge C is positioned within the axial thickness of the polar plate 24 (between A and B). Such a step for forming a clearance may be formed on the outer ring if the polar plate is fixed on the inner ring.

Even if a fishing reel including such a bearing is used in a harsh environment where seawater tends to adhere to and penetrate into the bearing, the seawater is shut out from the interior of the bearing that rotatably supports the drive shaft (handle shaft 2), so as to securely prevent degradation of smoothness and maintain stable sealing and smooth rotation of the handle shaft 2 for a long period. In particular, the bearing 3 may also have a sealing effect on the side where the magnet 22 and the polar plate 24 are fixed (the inner circumferential surface of the outer ring 3b in the embodiment); therefore, low viscosity moisture and dust from the fixed side can be securely shut off from the rolling members 3c to achieve a sufficient sealing effect. Thus, the fishing reel may allow stable winding operation for a long period.

In sealing, it is necessary only to magnetize the magnet 22 constituting a member such that the magnetic poles point to the axial directions and to dispose the magnet 22 in contact with the polar plate 24. Therefore, a small number of parts are required, and the magnet 22 is not required to have accurate dimensions, which facilitates the built-in work and reduces the cost. That is, secure sealing can be achieved even with a magnet having less accurate dimensions than other members; and the bearing 3 thus integrated into a unit can be treated in the same way as conventional bearings and does not reduce the build-in work efficiency.

The magnet 22, which retains the magnetic fluid on both the inner ring side and the outer ring side, is configured as one member; therefore, magnetic fluid seals can be simultaneously formed on the inner ring side and the outer ring side by oiling from one location, which increases the work efficiency in sealing. That is, since there is no polar plate on the rolling member side of the magnet 22, the magnetic fluid may readily move in the direction of press-fitting to form the outer ring magnetic fluid 25a.

In the embodiment, a step 3g may be formed on the outer ring 3b, and the step is used to form space (step clearance) where the magnetic fluid is effectively retained, which may readily increase the sealing effect. The outer ring magnetic fluid 25a may spread into a clearance between the outer circumferential surface of the magnet 22 and the inner circumferential surface of the outer ring 3b and a small clearance between the polar plate 24 and the inner circumferential surface of the outer ring 3b, so as to achieve more secure sealing on the outer ring side.

The above described components of the bearing 3 should preferably be corrosion resistant. This is because these components may rust due to adhered salt if seawater penetrates into the region not sealed with the magnetic sealing mechanism 20. More specifically, the inner ring 3a, the outer ring 3b, and the polar plate 24 may be subjected to anti-corrosion surface treatment such as electrolytic chromic acid treatment or electroless nickel plating, so as to enhance the corrosion resistance of these components. Thus, rusting of an exposed region not sealed with the magnetic sealing mechanism 20 can be effectively prevented. Alternatively, the components may be made of a highly corrosion resistant material (high corrosion resistance material), instead of being subjected to such a surface treatment. Examples of the high corrosion resistance material may include a stainless steel-based material containing Cr or Mo having excellent corrosion resistance. Such a material can be corrosion resistant against salt water with Cr content of about 12 to 18% or Mo content of about 1 to 3%.

At least one of the inner ring 3a, the outer ring 3b, and the polar plate 24 should be subjected to the anti-corrosion treatment or made of the high corrosion resistance material.

When the above bearing 3 is built into position, a magnetic body (magnetic material) present around the position may attract the bearing 3 to reduce the built-in work efficiency or may form another magnetic circuit in the vicinity to move the magnetic fluid and reduce the sealing quality. To facilitate built-in of the above bearing 3 into the reel body 1, the parts radially or axially adjacent to the bearing 3, such as the reel body, a frame, the shafts, a cover, and a housing, should preferably be made of a nonmagnetic material (aluminum, austenite-based stainless steel, copper alloy, resin, etc.).

Such configuration may enhance the built-in work efficiency and maintain a secured sealing quality.

Figure 5:
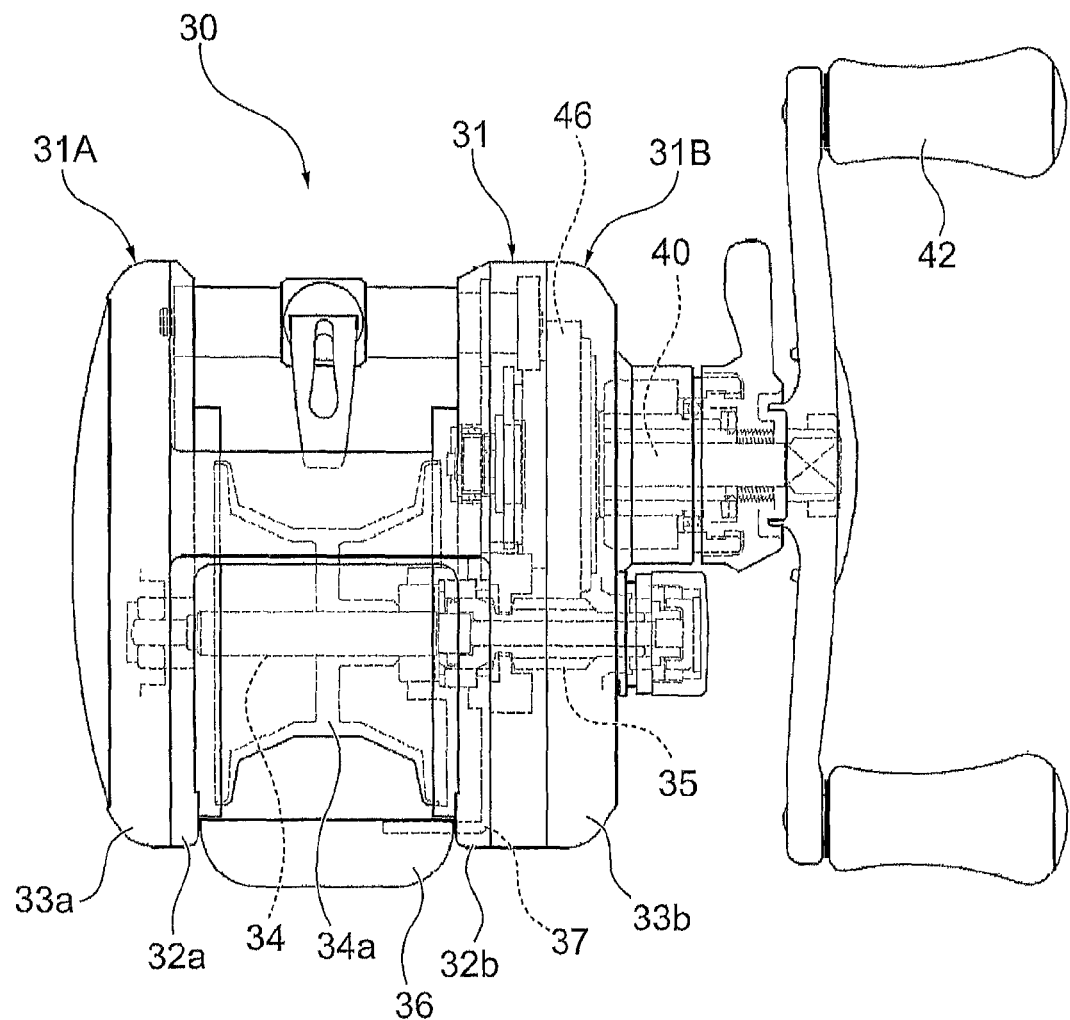
FIG. 5 shows a second embodiment of the fishing reel (double bearing reel) according to the present invention.
Figure 6:
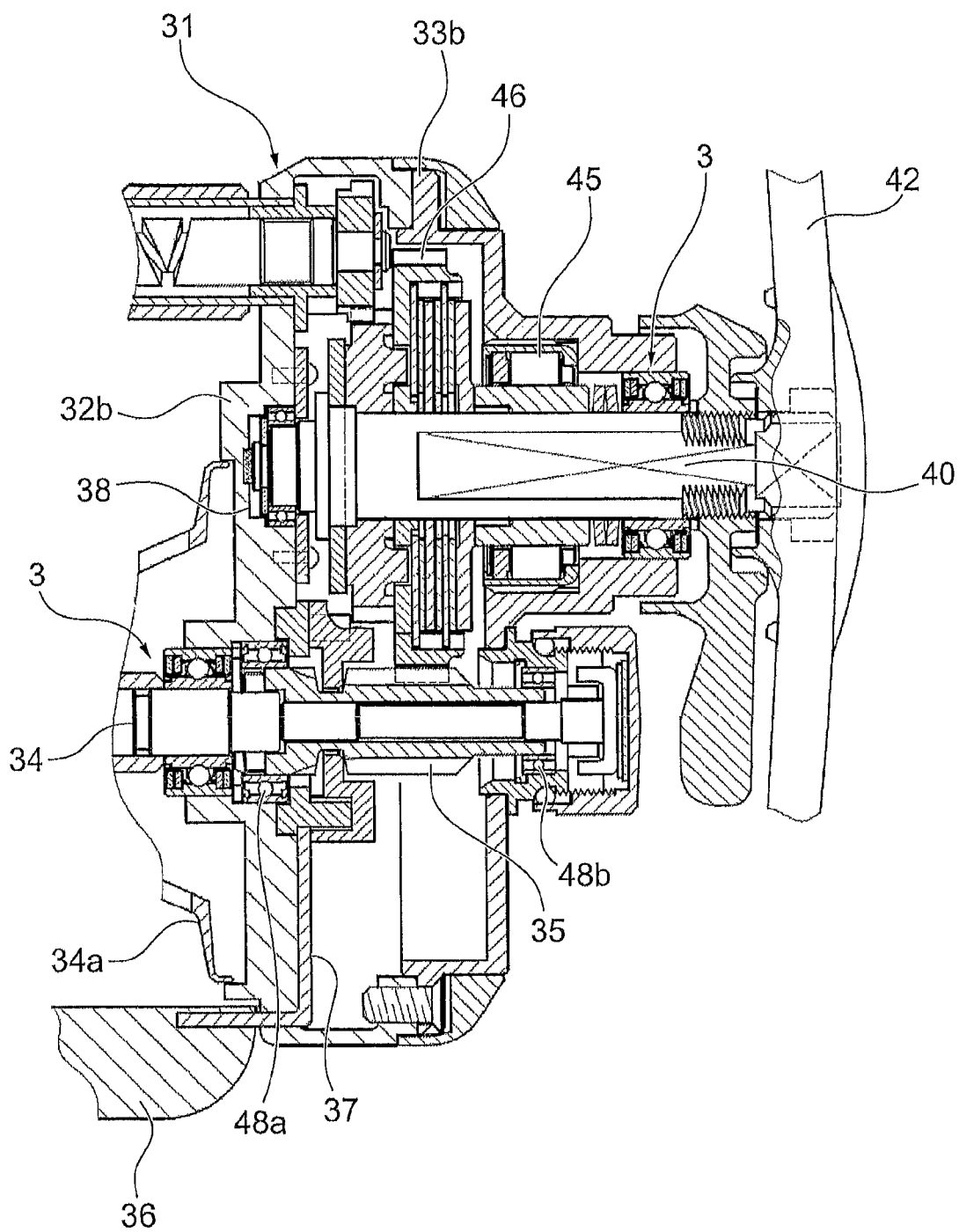
FIG. 6 is an enlarged view showing a handle shaft along with the internal structure of the fishing reel shown in FIG. 5.
Figure 7:
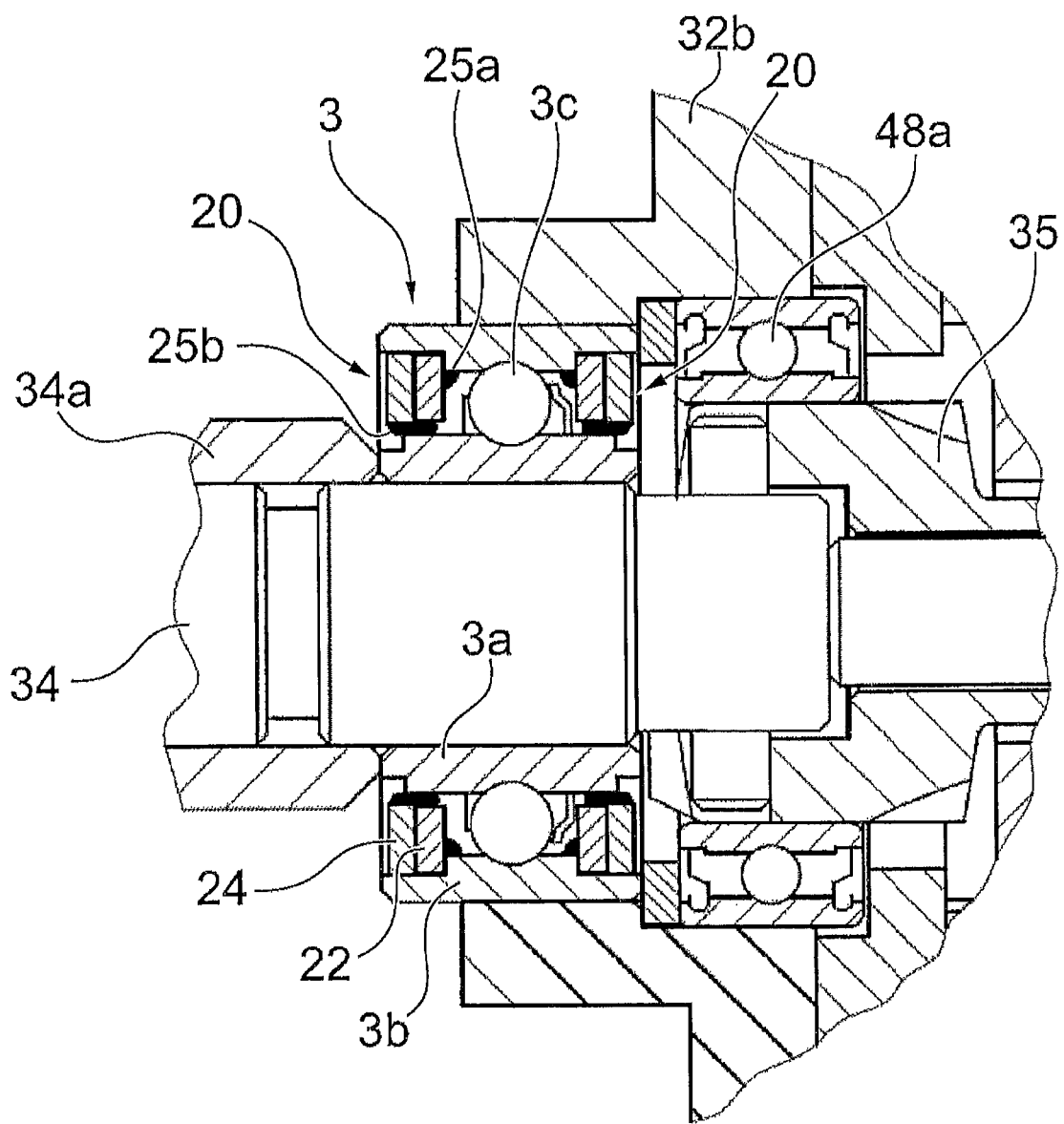
FIG. 7 is an enlarged view of a bearing mounted on a spool shaft shown in FIG. 6.
Figure 8:
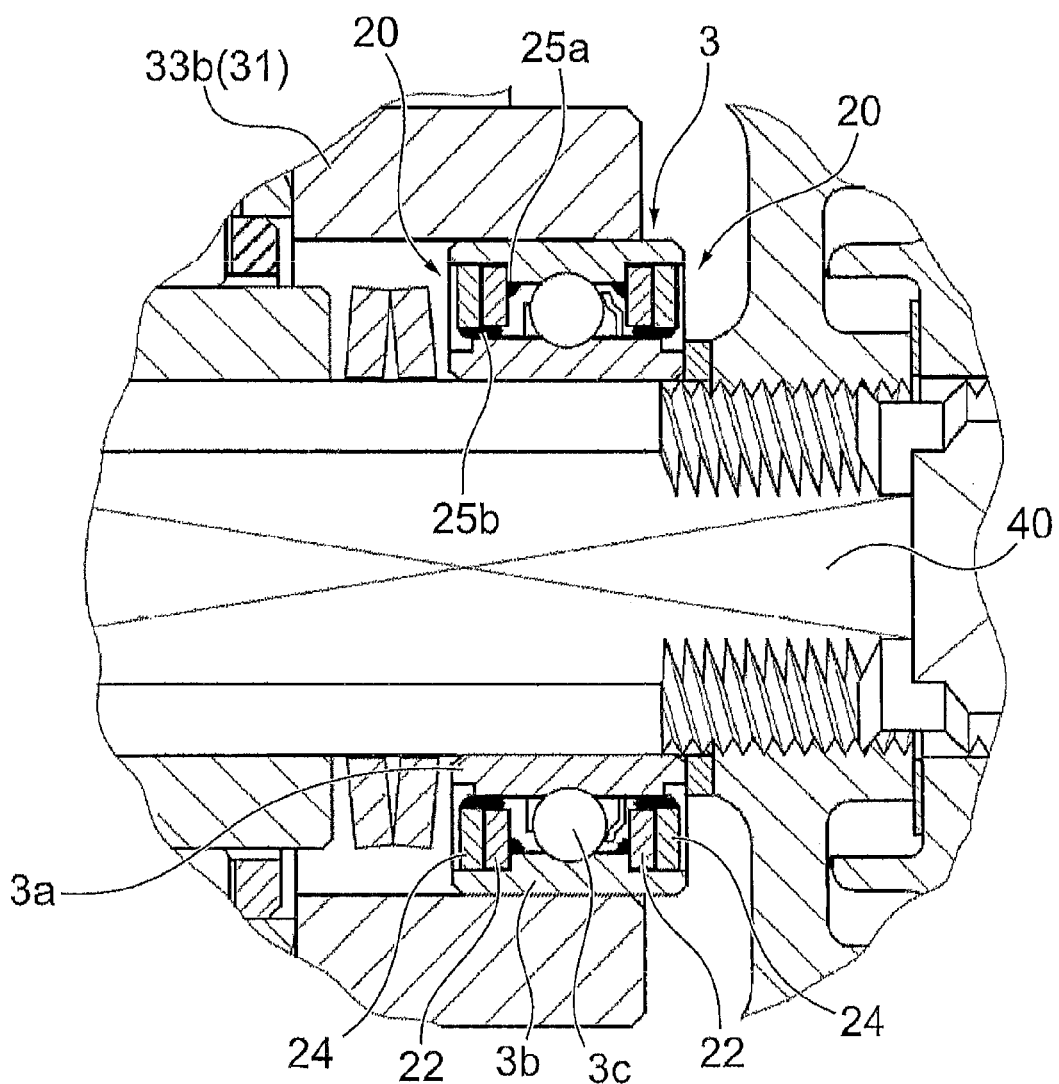
FIG. 8 is an enlarged view of a bearing mounted on the handle shaft shown in FIG. 6.

FIGS. 5 to 8 show the second embodiment of the fishing reel according to the present invention (a double bearing reel), wherein FIG. 5 shows the entire structure, FIG. 6 is an enlarged view showing a handle shaft portion along with the internal structure of the fishing reel shown in FIG. 5, FIG. 7 is an enlarged view of the bearing mounted on a spool shaft shown in FIG. 6, and FIG. 8 is an enlarged view of the bearing mounted on the handle shaft shown in FIG. 6.

In the embodiment described below, the bearing disposed on the drive shaft and including the sealing structure may have the same configuration as in the first embodiment. Therefore, the bearing is denoted by the same reference numerals as in the first embodiment, and detailed descriptions thereof are omitted. The detailed structure of the bearing may be as shown in FIG. 3.

The reel body 31 of the double bearing reel 30 according to the embodiment may include a left side plate 31A having a left frame 32a and a cover member 33a attached thereto and a right side plate 31B having a right frame 32b and a cover member 33b attached thereto. Between the left and right side plates 31A, 31B may be rotatably supported a spool shaft 34 via the bearing 3. A spool 34a for winding a fishing line may be integrally fixed on the spool shaft 34.

On the end of the spool shaft 34 may be mounted a pinion gear 35 movable along the axial direction of the spool shaft. The pinion gear may either support the spool shaft extended coaxially with the pinion gear or rotatably support a spindle rotatably disposed coaxially with the spool shaft.

The pinion gear 35 can be moved by a well known switching means between an engagement position where the pinion gear 35 engages with the spool shaft 34 and rotates integrally with the spool shaft 34 (a power transmitting state or a clutch-on state) and a non-engagement position where the pinion gear 35 is disengaged from the spool shaft 34 (an idling state or a clutch-off state). The switching means may include a switching lever 36 disposed between the left and right side plates 31A, 31B and a clutch plate 37 that rotates upon depressing of the switch lever 36. When the switching lever 36 is depressed, the switching means may switch from the power transmitting state to the idling state via the clutch plate 37.

Within the right side plate 31B, a handle shaft 40 may be rotatably supported via a bearing 38 disposed between the right frame 32b and the handle shaft 40 and the bearing 3 disposed between the right cover member 33b and the handle shaft 40; and a handle 42 may be mounted on an end of the handle shaft 40. Between the handle shaft 40 and the right cover member 33b may be disposed a one-way clutch 45 as a backstop; and the handle shaft 40 (handle 42) may be rotated only in the direction of winding the fishing line and prevented from rotating reversely.

The pinion gear 35 may be meshed with a drive gear 46 supported by the handle shaft 40; and when the handle 42 mounted on the end of the handle shaft 40 is rotationally operated, the spool shaft 34 may be rotationally driven via the drive gear 46 and the pinion gear 35, and accordingly the spool 34a may be rotated to wind the fishing line.

In the above fishing reel, the handle shaft 40 and the spool shaft 34 may be rotationally driven when the fishing line is wound around the spool (the handle 42 is rotationally operated). The bearings 3 rotatably supporting these drive shafts may be provided at both end surfaces thereof the magnetic sealing mechanism 20 as shown in FIG. 3.

Such a fishing reel provided with the bearing 3 having a sealing structure at rotationally driven portions may also achieve the same effect as the embodiment described above. Such a double bearing reel may have the same sealing structure as in the bearing 3 in the bearings 48a, 48b rotatably supporting the pinion gear 35 and the bearing 38 rotatably supporting the handle shaft at the proximal end of the handle shaft 40.

Figure 9:
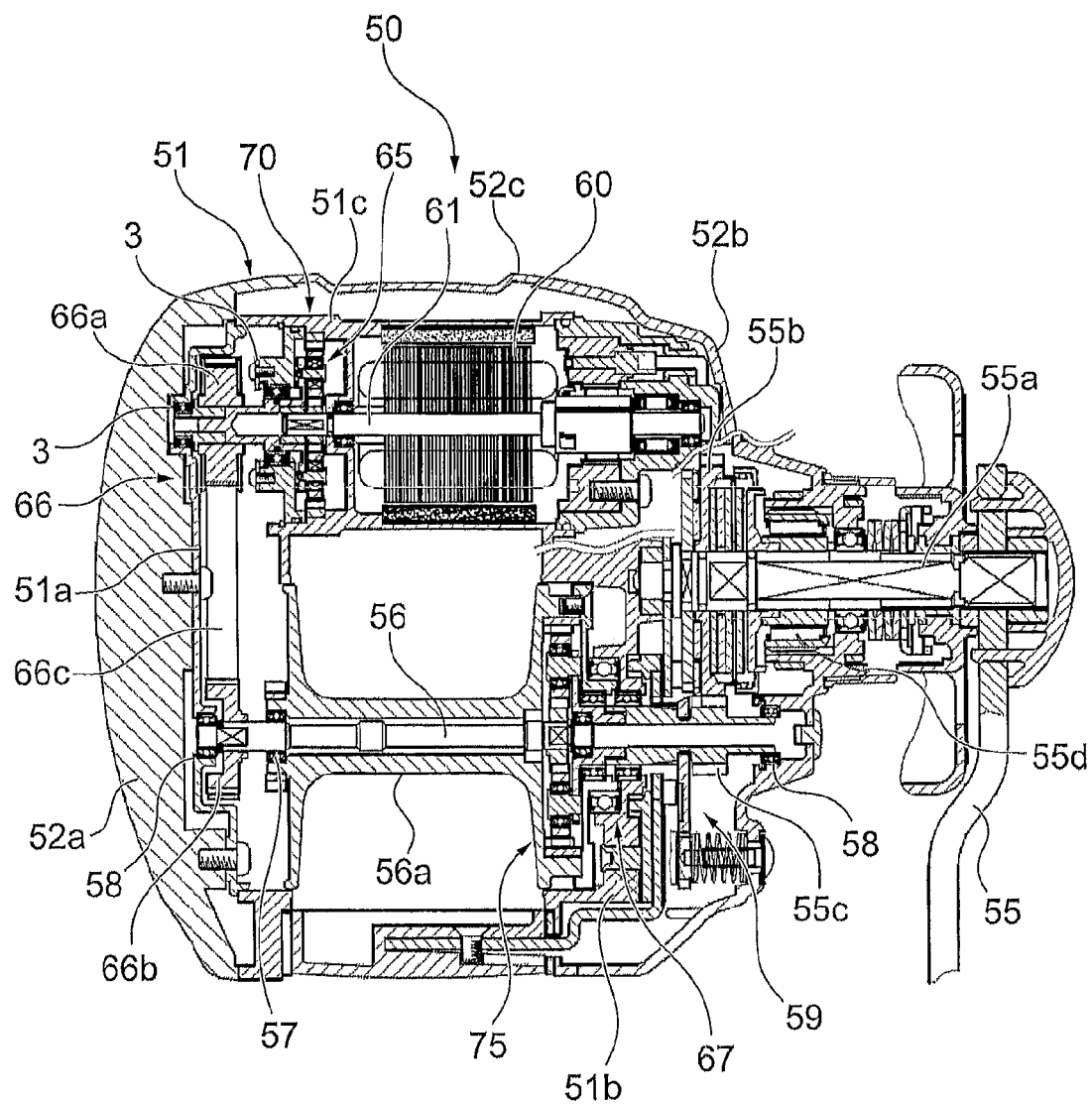
FIG. 9 shows internal structure of a third embodiment of the fishing reel (electric reel) according to the present invention.
Figure 10:
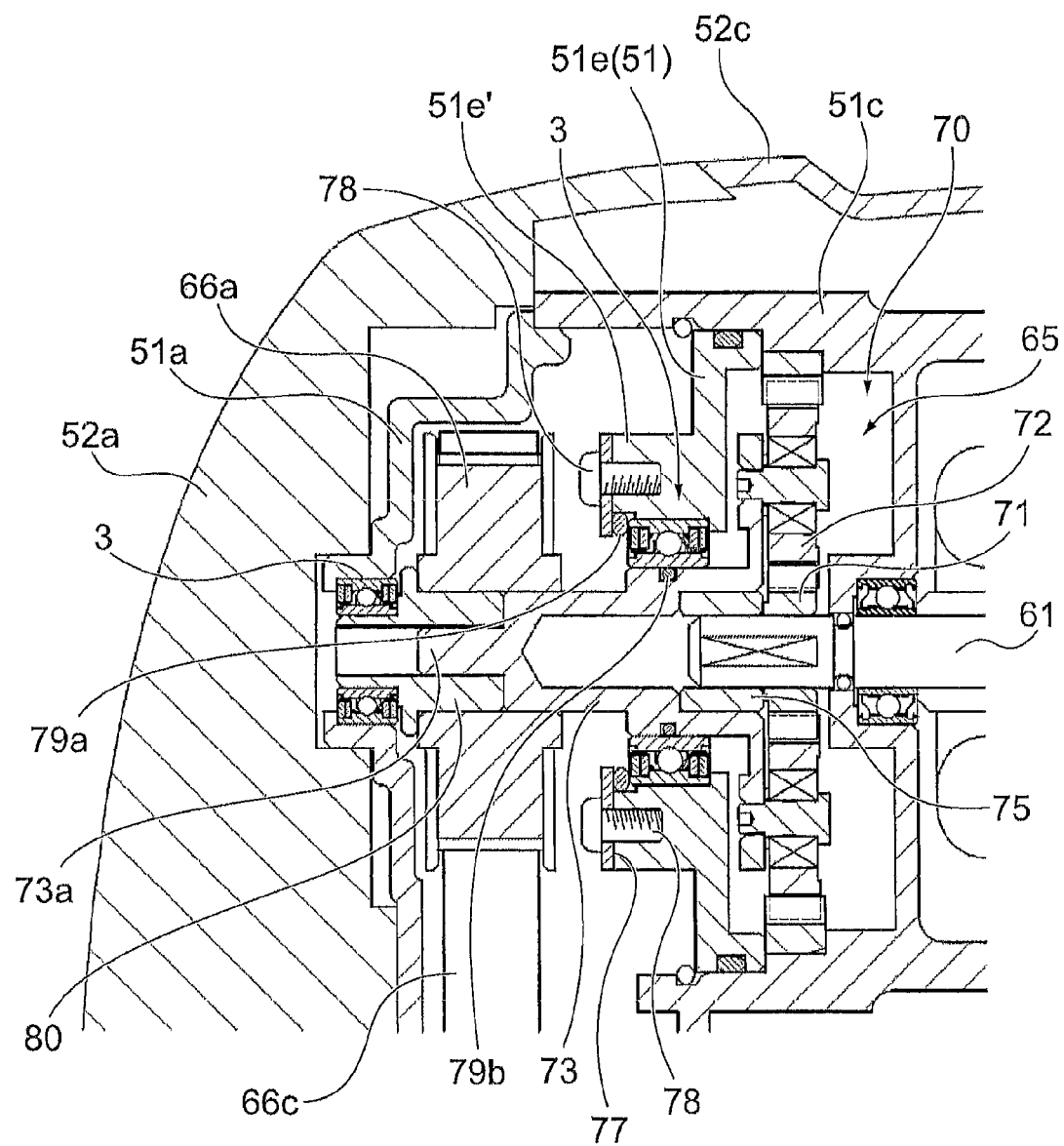
FIG. 10 shows a bearing mounted on a speed reducing mechanism disposed on an output shaft of a drive motor shown in FIG. 9.

FIGS. 9 and 10 show the third embodiment (electric reel) of the fishing reel according to the present invention, wherein FIG. 9 shows an internal structure, and FIG. 10 shows a bearing mounted on a speed reducing mechanism disposed on an output shaft of a drive motor shown in FIG. 9.

The reel body 51 of the electric reel 50 according to the embodiment may include the left and right frames 51a, 51b, and a front frame 51c disposed in front of the spool. These frames as a whole are integrated (these frames may be either individually formed integrally and collectively integrated by a fixing means or partially formed integrally and integrated as a whole).

The reel body 51 may further include a left outer side plate 52a covering the left frame 51a, a right outer side plate 52b covering the right frame 51b, and a front outer side plate 52c covering the front frame 51c. These outer side plates may cover the components such as a drive force transmission mechanism and serve as a grip to be held by an angler (contacted by hands of the angler). These outer side plates may be individually formed integrally and integrated as a whole. As with the frames described above, these outer side plates may be either formed integrally or partially formed integrally and integrated as a whole. The above frames may be partially exposed.

On the side for one of the side plates (the right outer side plate 52b) included in the reel body 51 may be disposed a manual handle 55 for winding operation; and between the left and right frames included in the reel body 51 may be rotatably supported a spool 56a for winding a fishing line. A drive motor 60 may be installed in front of the spool 56a. The spool 56a may be rotationally driven in the direction of winding a fishing line via the drive force transmission mechanism by means of the winding operating of the manual handle 55 and the rotational drive of the drive motor 60.

The spool 56a may be rotatably supported via the bearing 57 by the spool shaft 56 rotatably supported between the left and right side plates; and the spool shaft 56 may be rotatably supported at both ends thereof by the reel body via the bearing 58.

The spool 56a may receive a rotational drive force from the manual handle 55 and the drive motor 60 via the drive force transmission mechanism. The drive force transmission mechanism may be configured as below.

The drive force transmission mechanism of the embodiment may have a configuration separated into the left frame 51a and the right frame 51b. On the left frame 51b side may be provided a first speed reducing mechanism 65 for slowing the output of the drive motor 60, and an electric force transmission unit 66 for transmitting to the spool shaft 56 the rotational drive force slowed by the first speed reducing mechanism 65. On the right frame 51b side may be provided a second speed reducing mechanism 67 for slowing the rotational drive force of the spool shaft 56 and transmitting the rotational drive force to the spool 56a, and a manual force transmission unit 59 for transmitting a rotational drive force of the drive shaft (handle shaft) 55a of the manual handle 55 to the spool 56a via the second speed reducing mechanism 67.

The first speed reducing mechanism 65 may include a publicly known planetary gear mechanism 70 disposed between an output shaft 61 of the drive motor 60 and the front frame 51c. The electric force transmission unit 66 may include a pulley 66a which integrally rotates with a speed reducing sleeve (drive shaft) 73 rotating at a reduced speed of the output shaft 61, a pulley 66b which integrally rotates with the spool shaft 56, and a power transmission belt 66c turned around the pulleys 66a, 66b. The second speed reducing mechanism 67 may include a publicly known planetary gear mechanism 75 installed between the spool shaft 56 and the spool 56a; and the manual force transmission unit 59 may include a drive gear 55b rotatably mounted on the handle shaft 55a and a pinion gear 55c meshing with the drive gear 55b. The handle shaft 55a may be provided with a backstop (one-way clutch) 55d which prevents the manual handle 55 from being rotated by the rotational drive of the drive motor 60.

In the embodiment, the bearing 3 having the above described sealing structure may be disposed on the first speed reducing mechanism 65 mounted on the output shaft 61 of the drive motor 60. That is, as shown in FIG. 10, the planetary gear mechanism 70 included in the first speed reducing mechanism 65 may include a sun gear 71 which integrally rotates with the output shaft 61, and planet gears 72 meshing with the sun gear 71. The drive force slowed by the planet gears 72 may be transmitted to the speed reducing sleeve (drive shaft) 73 connected so as to be rotatable integrally with the revolution of the planet gears 72. The speed reducing sleeve 73 may be rotatably attached to an end of the output shaft 61 via a collar (bearing) 75; and the bearing 3 (see FIG. 3) may be disposed between the outer circumferential surface of the speed reducing sleeve 73 and the reel body 51 (a cover body 51e press-fitted into and integrated with the front frame 51c).

An annular projection 51e' may be formed on the cover body 51e; the speed reducing sleeve 73 may be inserted through the center hole of the annular projection 51e'; and the bearing 3 may be disposed between the annular projection 51e' and the speed reducing sleeve 73. On an end surface of annular projection 51e' on the outer side plate side may be contacted a plate 77 having a zone ring shape; and the bearing 3 is fixed so as not to come off, by screwing a plurality of screws 78 into the annular projection 51e'. That is, the bearing 3 may be fixed so as not to come off in the axial direction by fixing, onto the reel body (the annular projection 51e'), a separate retaining member (plate) contacted on the outer ring (or the inner ring) of the bearing 3.

In the embodiment, sealing members (as O-rings 79a, 79b) for enhancing the sealing quality may be provided between the outer ring of the bearing 3 and the annular projection 51e' and between the inner ring of the bearing 3 and the speed reducing sleeve 73. More specifically, the O-ring 79a may be disposed between the end surface of the outer ring of the bearing 3 and the back surface of the plate 77 for retaining the bearing 3; and when the plate 77 is fixed onto the annular projection 51e' with the screw 78, the O-ring 79a may be placed between and integrated with the plate 77 and the annular projection 51e' for sealing the outside of the outer ring. The O-ring 79b may be fitted into a circumferential groove formed in the surface of the speed reducing sleeve 73 and configured to seal the inside of the inner ring when the bearing 3 is press-fitted.

With the above sealing members (the O-rings 79a, 79b), the bearing 3 can be readily built into position within the reel body so as to enhance the sealing function. Since the sealing members seal the inside of the inner ring and the outside of the outer ring of the bearing 3, the moisture moving on the surfaces of the inner ring and the outer ring can be securely shut out from the interior (the speed reducing mechanism, the drive motor, etc.). As on the inner ring side, the sealing on the outer ring side may also be achieved by forming a circumferential groove in the annular projection 51e' and press-fitting the O-ring into the groove to seal the clearance with the outer circumference of the outer ring.

On the end of the speed reducing sleeve 73 may be integrally formed a penetration shaft 73a provided with a collar (drive shaft) 80. In the embodiment, the bearing 3 having the above described sealing structure may also be disposed between the outer circumferential surface of the collar 80 and the reel body 51 (left frame 51a).

Such a fishing reel provided with the bearing 3 having a magnetic sealing mechanism at rotationally driven portions may also achieve the same effect as the embodiment described above.

In such an electric reel, a bearing 3 having the same sealing structure may be used as the bearing 58 supporting the spool shaft 56 and the bearing supporting the handle shaft.

Figure 11:
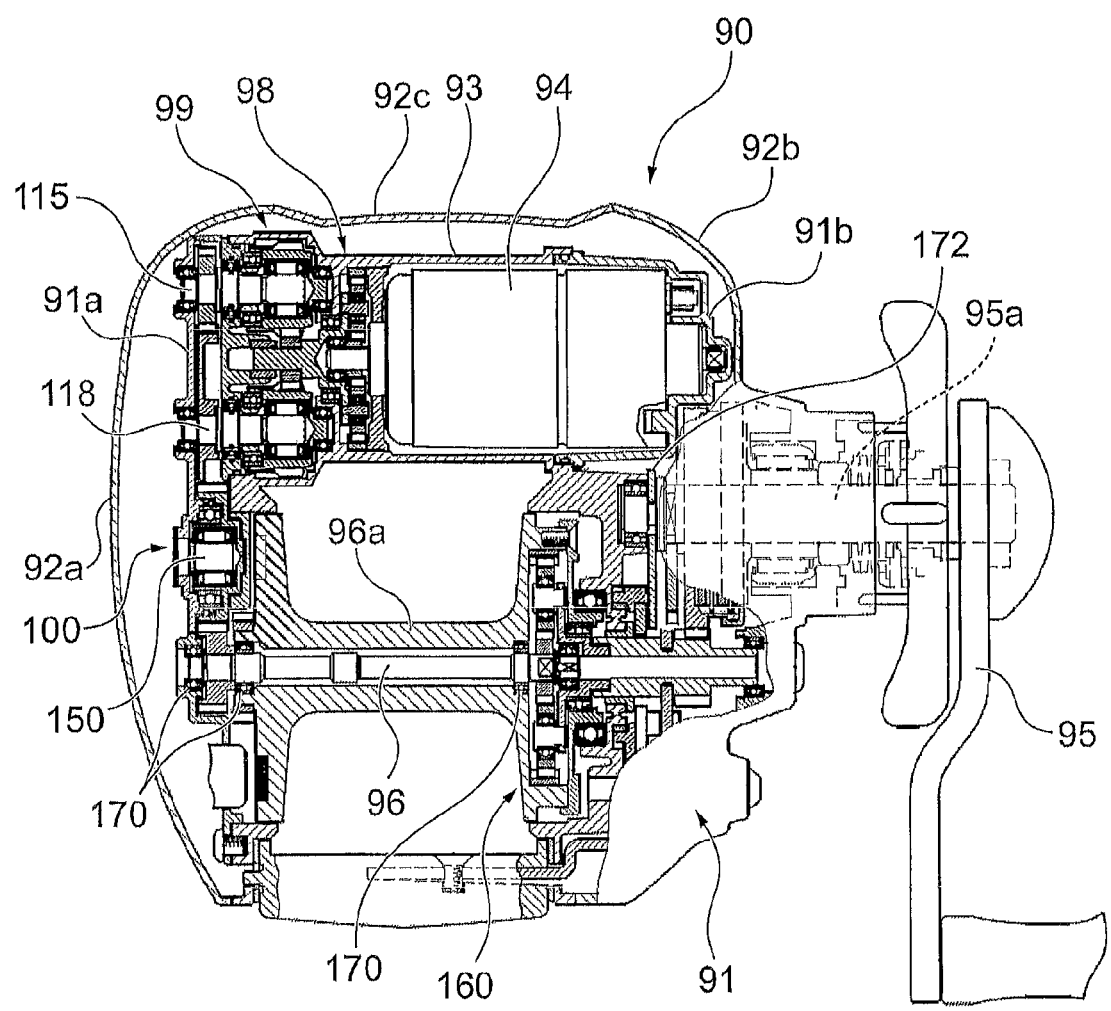
FIG. 11 shows a fourth embodiment of the fishing reel (electric reel) according to the present invention.
Figure 12:
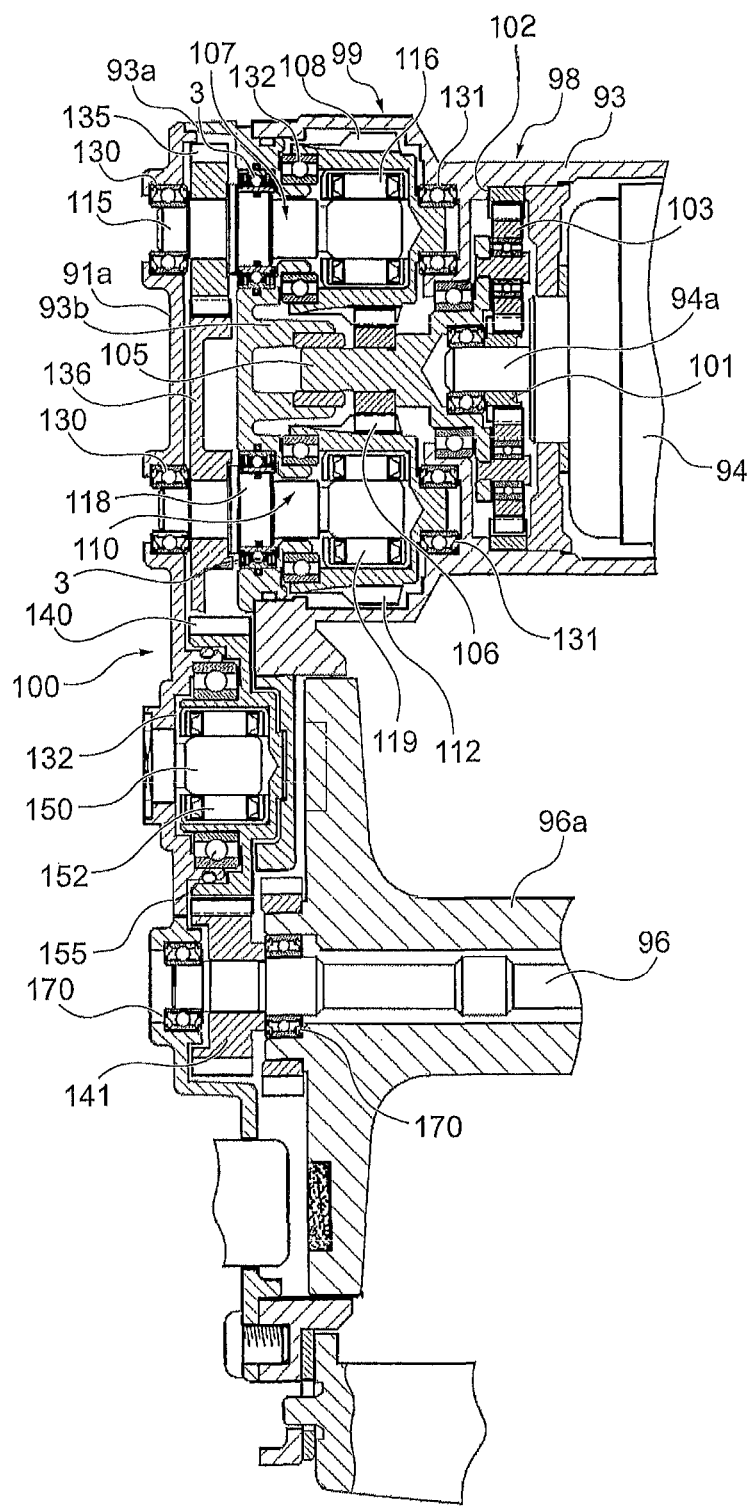
FIG. 12 is an enlarged view of a drive force transmission mechanism of the electric reel shown in FIG. 11.

FIGS. 11 and 12 show the fourth embodiment (electric reel) of the fishing reel according to the present invention, wherein FIG. 11 shows an entire structure, and FIG. 12 shows a drive force transmission mechanism portion of the electric reel shown in FIG. 11. The electric reel according to the embodiment has been disclosed in the Japanese Patent Application Publication No. 2009-39066 and detailed description thereon will be omitted.

The reel body 91 of the electric reel according to the embodiment may include a left frame 91a and a right frame 91b; and a motor case 93 housing a drive motor 94 may be disposed in front of the left and right frames. The reel body 91 may include a left outer side plate 92a covering the left frame 91a, a right outer side plate 92b covering the right frame 91b, and a front outer side plate 92c covering the front of the motor case 93. These outer side plates may cover the components such as a drive force transmission mechanism and serve as a grip to be held by an angler (contacted by hands of the angler). The outer side plates may be partially formed integrally and integrated as a whole; and the frame may be partially exposed.

On the side for one of the side plates (the right outer side plate 92b) included in the reel body 91 may be disposed a manual handle 95 for winding operation; and between the left and right frames included in the reel body 91 may be rotatably supported a spool 96a for winding a fishing line via a spool shaft 96.

The spool 96a may be rotationally driven in the direction of winding a fishing line via the drive force transmission mechanism by means of the winding operating of the manual handle 95 and the rotational drive of the drive motor 94.

Between an output shaft 94a of the drive motor 94 and the spool shaft 96 may be sequentially mounted a first speed reducing mechanism (planetary gear mechanism) 98, a mechanical transmission mechanism 99, and a drive force transmission mechanism 100. The rotation speed of the drive motor 94 may be reduced/varied at the first speed reducing mechanism 98 and the mechanical transmission mechanism 99 and may be transmitted to the spool shaft 96 via the drive force transmission mechanism 100.

The first speed reducing mechanism 98 may include a sun gear 101 provided on the output shaft 94a and a plurality of planet gears 103 meshing with internal teeth 102 provided on the motor case and the sun gear 101. The planet gears 103 may be connected with a speed reducing sleeve 105 disposed coaxially with the output shaft 94a; and the speed reducing sleeve 105 may be rotationally driven (at a reduced speed) in accordance with the revolution of the planet gears 103 when the output shaft 94a is rotationally driven.

On the speed reducing sleeve 105 may be integrally mounted an output gear 106; and the output gear 106 may mesh with a low-speed input gear (input section of the mechanical transmission mechanism 99) 108 of a low-speed gear transmission mechanism 107 and a high-speed input gear (input section of the mechanical transmission mechanism 99) 112 of a high-speed gear transmission mechanism 111. The mechanical transmission mechanism 99 may be constituted by the low-speed gear transmission mechanism 107 and the high-speed gear transmission mechanism 110.

The low-speed input gear 108 and the high-speed input gear 112 may have the same outer diameter and the same gear ratio to the output gear 106; the low-speed input gear 108 may be unrotatably fitted onto the outer ring of the one-way clutch 116 mounted on the low-speed output shaft (spindle) 115; and the high-speed input gear 112 may be unrotatably fitted onto the outer ring of the one-way clutch 119 mounted on the high-speed output shaft (spindle) 118.

The one-way clutches 116, 119 may rotate in opposite directions to transmit a force. When the drive motor 94 rotates reversely and the low-speed input gear 108 rotates forwardly, the one-way clutch 116 mounted on the spindle 115 for the low-speed input gear 108 may transmit the rotational force of the low-speed input gear 108 to the spindle 115 by the wedge effect thereof; and when the drive motor 94 rotates forwardly and the low-speed input gear 108 rotates reversely, the one-way clutch 116 may not transmit the rotational force to the spindle 115 (the spindle 115 may rotate idly).

On the other hand, when the drive motor 94 rotates reversely and the high-speed input gear 112 rotates forwardly, the one-way clutch 119 mounted on the spindle 118 for the high-speed input gear 112 may not transmit the rotational force thereof to the spindle 118 (the spindle 118 may rotate idly); and when the drive motor 94 rotates forwardly and the high-speed input gear 112 rotates reversely, the one-way clutch 119 may transmit the rotational force of the high-speed input gear 112 to the spindle 118 by the wedge effect thereof.

Each of the spindles 115, 118 may be rotatably supported by the bearings 130, 3, 131, etc. on the left frame 91a, the cap member 93a closing the motor case 93, and the motor case 93. A projecting end of the speed reducing sleeve 105 may be supported via a collar in a tubular support 93b projected from the middle of the cap member 93a; and the low-speed input gear 108 and the high-speed input gear 112 may be supported by the bearing 132 on the outer circumference of the two tubular support provided on the cap member 93a.

On the spindle 115 may be unrotatably fitted a low-speed output gear 135 of the low-speed gear transmission mechanism 107, the low-speed output gear 135 having a small diameter. On the spindle 118 may be unrotatably fitted a high-speed output gear 136 of the high-speed gear transmission mechanism 110, the high-speed output gear 136 having a large diameter. These output gears are arranged in series and meshed with each other. The high-speed output gear 136 may be meshed with a joint gear 140 of the drive force transmission mechanism 100.

The drive force transmission mechanism 100 may include a spool shaft drive gear 141 mounted on an end of the spool shaft 96 and the joint gear 140 disposed between the spool shaft drive gear 141 and the high-speed output gear 136 and meshing therewith. The spool shaft drive gear 141 and the joint gear 140 may be arranged in series with the low-speed output gear 135 and the high-speed output gear 136.

The joint gear 140 may be unrotatably fitted onto the outer ring of the one-way clutch 152 disposed on the spindle 150, and may be rotatably supported by the left frame 91a via the bearing 155. During the winding operation of the handle 95, the rotation of the joint gear 140 may be prevented by the wedge effect of the one-way clutch 152; that is, the drive force of the handle 95 cannot be transmitted toward the drive motor 94, which produces a reaction force causing the drive force of the handle 95 to be transmitted from the second speed reducing mechanism (planetary gear mechanism) 160 disposed on the right outer side plate 92b side to the spool 96a, to rotate the spool in the direction of winding a fishing line. The second speed reducing mechanism 160, which may be mounted on the projecting end of the spool shaft 96 on the right side plate side, may slow the rotational drive force of the drive motor 94 and transmit the rotational force of the handle 95 to the spool 96a, That is, when the handle 95 is operated for winding a fishing line, rotation of the joint gear 140 meshing with the spool shaft drive gear 141 may be prevented by the wedge effect of the one-way clutch 152; therefore, the rotational force of the handle 95 may be transmitted from the second speed reducing mechanism 160 to the spool 96a to rotate the spool in the direction of winding a fishing line.

Such an electric reel provided with the bearing 3 having a magnetic sealing mechanism at rotationally driven portions may also achieve the same effect as in the embodiment described above.

The electric reel of the embodiment may include bearings at various portions, which may be configured as the bearing 3 described above as necessary. For example, a bearing 3 having the same sealing structure may be used as the bearing 170 supporting the spool shaft 96 and the bearing 172 supporting the handle shaft 95a.

Embodiments of the present invention are not limited to the above descriptions and are susceptible to various modifications for implementation.

The above described magnetic sealing mechanism is a mere example and is susceptible of appropriate modifications in configuration and arrangement of the magnet and the polar plate. For example, the magnet retained by the polar plate may be placed between a pair of polar plates; and various modifications are possible in the method of axially positioning the outer ring and the inner ring and the method of sealing the surface of the outer ring and the surface of the inner ring.

What is claimed is:

1. A fishing reel comprising:
    a drive shaft to be rotationally driven for winding a fishing line around a spool; and
    a magnetic fluid sealed bearing configured to rotatably support the drive shaft, the magnetic fluid sealed bearing having an inner ring magnetic fluid and an outer ring magnetic fluid;
    wherein the inner ring magnetic fluid is retained between an inner ring and a polar plate retaining a magnet and/or between the inner ring and the magnet; and
    wherein the outer ring magnetic fluid is retained between an outer ring and the polar plate and/or between the outer ring and the magnet.

2. The fishing reel of claim 1, wherein a step is formed on an inner surface of the outer ring or the inner ring facing rolling members in such a manner that a distance between the inner ring and the outer ring is larger in axially outer regions than in an axially inner region.

3. The fishing reel of claim 1 wherein a step for retaining a magnetic fluid is formed on the inner ring or the outer ring in a clearance with the polar plate such that an edge of the step is positioned within an axial thickness of the polar plate.

4. The fishing reel of claim 1 wherein the polar plate is recessed from an end surface of the outer ring and an end surface of the inner ring.

5. The fishing reel of claim 1 wherein one or more of the outer ring, the inner ring, and the polar plate are subjected to electrolytic chromic acid treatment or electroless nickel plating.

6. The fishing reel of claim 1 wherein one or more of the outer ring, the inner ring, and the polar plate include a stainless steel-based high corrosion resistance material.

7. The fishing reel of claim 1 wherein parts radially and axially adjacent to the bearing are formed of a nonmagnetic material.

* * * * *